United States Patent
Tsuyama

(10) Patent No.: US 7,203,392 B2
(45) Date of Patent: Apr. 10, 2007

(54) OPTICAL APPARATUS FOR BIDIRECTIONAL OPTICAL COMMUNICATION

(75) Inventor: Isao Tsuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 82 days.

(21) Appl. No.: 10/807,256

(22) Filed: Mar. 24, 2004

(65) Prior Publication Data
US 2005/0111788 A1 May 26, 2005

(30) Foreign Application Priority Data
Nov. 21, 2003 (JP) ............................. 2003-393172

(51) Int. Cl.
G02B 6/26 (2006.01)
G02B 6/28 (2006.01)
G02B 6/12 (2006.01)

(52) U.S. Cl. .............................. 385/17; 385/24; 385/14
(58) Field of Classification Search .................. 385/17, 385/24, 14; 398/1, 9
See application file for complete search history.

(56) References Cited

U.S. PATENT DOCUMENTS

| 6,101,012 | A  | * | 8/2000  | Danagher et al. .............. 398/1 |
| 6,278,536 | B1 |   | 8/2001  | Kai et al. |
| 6,333,799 | B1 | * | 12/2001 | Bala et al. ....................... 398/9 |
| 6,411,407 | B1 | * | 6/2002  | Maxham ...................... 398/173 |
| 2002/0064340 | A1 |   | 5/2002 | Fukuchi et al. |
| 2002/0191250 | A1 | * | 12/2002 | Graves et al. ............... 359/128 |
| 2005/0111788 | A1 | * | 5/2005  | Tsuyama ...................... 385/24 |
| 2005/0175342 | A1 | * | 8/2005  | Nakajima et al. ............. 398/45 |

FOREIGN PATENT DOCUMENTS

JP 63-312732 12/1988
JP 11-127121 5/1999

* cited by examiner

Primary Examiner—Kaveh Kianni
(74) Attorney, Agent, or Firm—Staas & Halsey LLP

(57) ABSTRACT

The present invention is directed to provide a small sized optical apparatus, with low cost and low loss, by realizing a simple structure optimum to bidirectional optical communication. To this end, the present invention comprises three optical multiplexing/demultiplexing sections, in order to make a transmitted light and a received light transmitted bidirectionally in the same transmission path fiber into the light in a single direction, to give these to a single optical processing section (34). The first optical multiplexing/demultiplexing section (31) is connected with a transmission path fiber (2) at a multiplexing side port thereof. The second optical multiplexing/demultiplexing section (32) is connected with an optical output port of an optical transmission section at a demultiplexing side port corresponding to the transmitted light, connected with a demultiplexing side port corresponding to the received light of the first optical multiplexing/demultiplexing section (31) at a demultiplexing side port thereof corresponding to the received light, and connected with an optical input port of an optical processing section (34) at a combined side port thereof. In the third optical multiplexing/demultiplexing section (33) is connected with an optical output port of the optical processing section (34) at a combined side port thereof, connected with a demultiplexing side port corresponding to the transmitted light of the first optical multiplexing/demultiplexing section (31) at a demultiplexing side port thereof corresponding to the transmitted light, and connected with an optical input port of an optical reception section at a demultiplexing side port thereof corresponding to the received light.

8 Claims, 6 Drawing Sheets

(A) FIRST WAVELENGTH ALLOCATION EXAMPLE (B) SECOND WAVELENGTH ALLOCATION EXAMPLE

BIDIRECTIONAL RING NETWORK

SUBSCRIBER INTERFACE NETWORK

NODE APPARATUS SIDE    SUBSCRIBER SIDE (REMOTE CONTROL)

OPTICAL APPARATUS FOR BIDIRECTIONAL OPTICAL COMMUNICATION

BACKGROUND OF THE INVENTION (1) Field of the Invention

The present invention relates to an optical apparatus for bidirectional optical communication, which allocates different wavelengths to upstream (transmission) and downstream (reception) optical signals, to transmit each optical signal using one optical fiber, in optical communication.

(2) Related Art

In recent years, as integrated transmission and reception type optical transceivers have become widespread, also in communication systems, attention has been given to bidirectional optical communication wherein transmission and reception are performed simultaneously using just one optical fiber. For example, in the case where bidirectional optical transmission is performed between a local station and a remote station, by allocating different wavelengths for transmission (from the local station to the remote station) and reception (from the remote station to the local station) by using WDM (Wavelength Division Multiplexing) techniques, the transmission and reception can be performed using the same optical transmission path. In such bidirectional optical communication, since it is possible to reduce the number of optical transmission paths, there is an effect that the cost required for the laying, maintenance and administration of the optical fiber can be reduced. Especially, from the standpoint of constructing a simple and economical WDM network, there is expectation of bidirectional optical communication using CWDM (Coarse Wavelength Division Multiplexing) techniques with wide wavelength spacing. Therefore, also in the optical apparatus for bidirectional optical communication, there is a problem of realizing an apparatus with low cost and high functionality.

Incidentally, in optical apparatuses for bidirectional optical communication, in the case where optical processing, for example, optical spectrum supervision, optical amplification, dispersion compensation and the like, is performed on a transmitted light and a received light, it is generally difficult to make means for realizing such optical processing to be common to both the transmission side and the reception side. For example, in a known optical fiber amplifier and the like, usually, since an optical isolator is disposed on the optical path in order to reduce an influence by the reflection of pumping light, it is possible to cope with only optical signals in a single direction. In the case where the optical isolator is omitted from such an optical fiber amplifier in order to cope with bidirectional optical signals, there is a possibility that coherent cross talk occurs between signal wavelengths, resulting in deterioration of a transmission characteristic. Therefore, in an optical apparatus such as a conventional optical fiber amplifier or the like, as shown in FIG. 8 for example, it is necessary to separate optical signals being propagated bidirectionally through a transmission path fiber, into the optical signals in each one-way direction using optical path direction selecting means such as an optical circulator or the like, and provide an individual optical processing section for each of the optical signals. Accordingly, in an optical apparatus with a configuration as described above, there is a problem in that there is no merit by bidirectional optical communication in terms of the cost, power consumption and the like.

Note, the expression "optical processing" used in the present specification means processing such as the above-mentioned optical spectrum supervision, optical amplification, dispersion compensation and the like, and does not refer to the contents of calculations or the like using optical signals.

As a technique for solving the problems described above, an apparatus as shown in FIG. 9, for example, has been proposed (refer to Japanese Unexamined Patent Publication No. 11-127121) in which the steams of the optical signals separated into each one-way direction by optical circulators, are made into the steam in a single direction using a pair of optical multiplexing/demultiplexing devices, so that bidirectional optical signals can be processed by one optical processing section.

However, in the conventional configuration as shown in FIG. 9, by making the steams of bidirectional optical signals into the steam in a single direction, it is no longer necessary to individually provide optical processing sections corresponding to each of the directions. However, the structure around the optical processing section is complicated, so there is a disadvantage in that the number of components is increased. Such an increase in the number of components is not only accompanied by extra loss in the optical signals, but it also decreases the benefits of cost reduction in the whole apparatus. The integration of optical components for example is effective for reducing optical signal loss and reducing the apparatus cost. However, since all of the optical components disposed around the optical processing section, such as optical circulators, optical multiplexing/demultiplexing devices and the like, are normally constructed using different devices, it is difficult to integrate such optical components.

SUMMARY OF THE INVENTION

The present invention has been accomplished in view of the above-described points, and has an object of providing a small sized optical apparatus with low cost and low loss, by realizing a simple structure optimum to bidirectional optical communication.

In order to achieve the above object, an optical apparatus for bidirectional optical communication according to the present invention comprises: an optical transmission section that outputs a transmitted light; an optical reception section that is input with a received light whose wavelength is different from that of the transmitted light; an apparatus, which includes an optical isolator, outputting the light input thereto, via the optical isolator; a first optical component, which includes first through third ports, outputting the light input to the first port to the third port, and outputting the light input to the second port to the first port; a second optical component multiplexing the transmitted light output from the optical transmission section with the light output from the third port of the first optical component, to output the multiplexed light to the apparatus; and a third optical component separating the light output from the apparatus according to wavelength difference, to output the separated lights to the second port of the first optical component and to the optical reception section, respectively.

In the optical apparatus with such a configuration, the transmitted light output from the optical transmission section is given to the second optical component. The received light output from the third port of the first optical component is also given to this second optical component, and the light in a single direction obtained by multiplexing the transmitted light and received light is output from the second optical component to the apparatus including the optical isolator. Then, the light given to that apparatus is given to the third optical component after subjected to predetermined optical processing, to be separated into the transmitted light and received light according to wavelengths, and the transmitted light is output to the first optical component, and the received light is output to the optical reception section.

With the optical apparatus for bidirectional optical communication according to the present invention as described above, in a simple structure in which three optical components are combined, it becomes possible to make each of optical signals transmitted bidirectinally into the optical signals in a single direction, thereby enabling to process a transmitted light and a received light at the same time using only one apparatus including an optical isolator. Therefore, it is possible to reduce the number of components around the apparatus performing optical processing such as optical amplification, thus enabling an optical signal loss to be reduced, and the apparatus cost to be reduced.

Other objects, features and advantages of the present invention will become apparent from the following descriptions of the embodiments, in conjunction with the appended drawings.

DETAILED DESCRIPTION OF THE INVENTION

Figure 1:
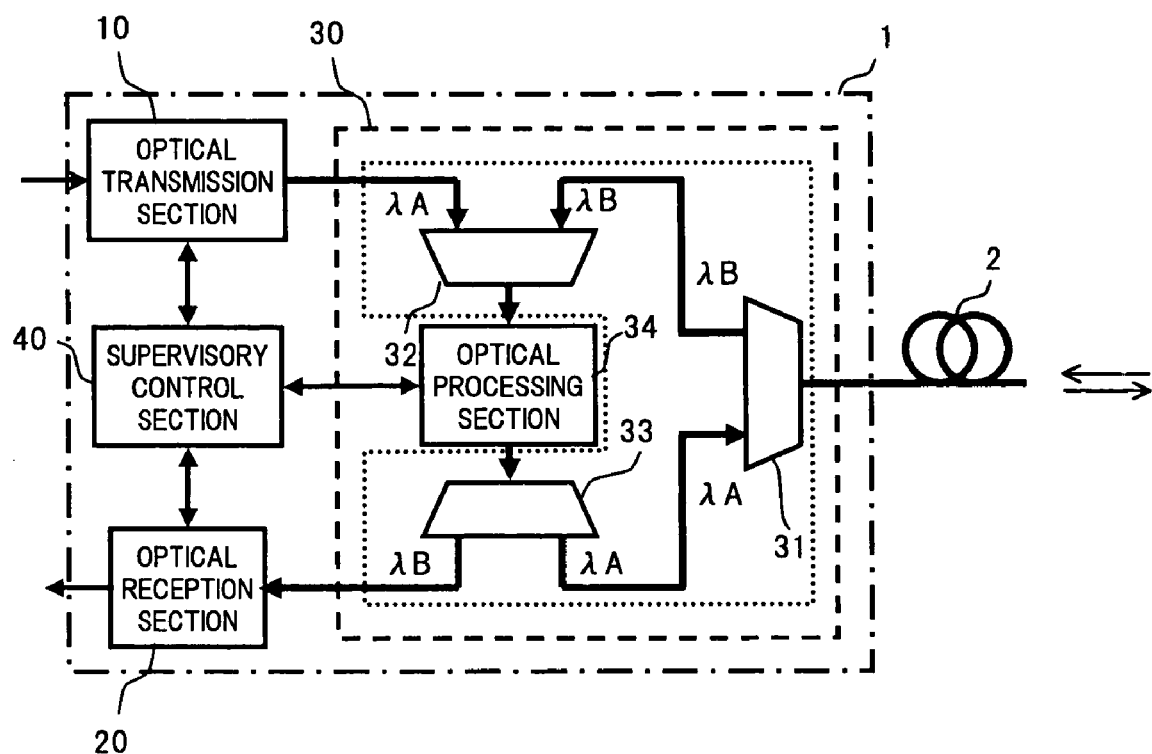
FIG. 1 is a functional block diagram showing a configuration of an optical apparatus for bidirectional optical communication according to a first embodiment of the present invention.

Hereunder are descriptions of preferred embodiments to implement an optical apparatus for bidirectional optical communication according to the present invention, with reference to appended drawings. Identical reference numerals denote identical or equivalent parts throughout all of the figures.

FIG. 1 is a functional block diagram showing a configuration of an optical apparatus for bidirectional optical communication according to a first embodiment of the present invention.

In FIG. 1, the present apparatus 1 comprises for example, an optical transmission section 10, an optical reception section 20, a bidirectional optical unit 30, and a supervisory control section 40.

Assuming the case where bidirectional optical transmission is performed for example between its own apparatus and the other apparatus (not shown in the figure), connected via a single transmission path fiber 2, the optical transmission section 10 generates an optical signal to be transmitted from the own apparatus to the other apparatus in accordance with a data signal given to a data input port thereof, and sends out this transmitted light from an optical output port thereof to the transmission path fiber 2 via the bidirectional optical unit 30. On the other hand, the optical reception section 20 receives, at an optical input port thereof via the bidirectional optical unit 30, an optical signal which is sent from the other apparatus and is propagated through the transmission path fiber 2 up to the own apparatus, and outputs a data signal obtained by regenerating the received light from a data output port thereof. The optical transmission section 10 and the optical reception section 20 are both shown as independent function blocks. However, needless to say, an integrated transmission and reception type optical transceiver may also be used.

The bidirectional optical unit 30 includes for example, optical multiplexing/demultiplexing sections 31, 32 and 33 corresponding to first to third optical components, and an optical processing section 34 serving as an apparatus for outputting a light input thereto via an optical isolator. Each of the optical multiplexing/demultiplexing sections 31 to 33 here includes first to third ports, and has a transmission characteristic capable of demultiplexing a WDM light input to the first port (the multiplexing side port), to output the demultiplexed light from the second port (the demultiplexing side port corresponding to a wavelength of the transmitted light) or the third port (the demultiplexing side port corresponding to a wavelength of the received light) corresponding to wavelength, and also multiplexing the optical signal input to the second port with the optical signal input to the third port, to output the multiplexed light from the first port.

For a specific configuration of each of the optical multiplexing/demultiplexing sections 31 to 33, it is possible to use a known optical multiplexer/demultiplexer, which uses for example, an arrayed waveguide grating (AWG), a fiber Bragg grating (FBG) or the like. Here, a configuration is adopted in which three optical multiplexing/demultiplexing sections 31 to 33 using AWGs are integrated onto the same substrate, as shown by enclosing with the dotted line in FIG. 1. Further, as another specific example of a configuration of each of the optical multiplexing/demultiplexing sections 31 to 33, it is also possible to combine an optical coupler, an optical filter or the like. In this case, for the optical multiplexing/demultiplexing section 31, it is possible to use an optical coupler or an optical circulator using a high-pass filter or a low-pass filter. Moreover, for each of the optical multiplexing/demultiplexing sections 32 and 33, it is possible to use an optical coupler using a high-pass filter or a low-pass filter.

The specific description is made on the connections between the ports of the optical multiplexing/demultiplexing sections 31 to 33. The first port of the optical multiplexing/demultiplexing section 31 is connected with one end of the transmission path fiber 2. The second port of the optical multiplexing/demultiplexing section 32 is connected with the optical output port of the optical transmission section 10, the third port thereof is connected with the third port of the optical multiplexing/demultiplexing section 31, and the first port thereof is connected with an optical input port of the optical processing section 34. The first port of the optical multiplexing/demultiplexing section 33 is connected with an optical output port of the optical processing section 34, the second port thereof is connected with the second port of the optical multiplexing/demultiplexing section 31, and the third port thereof is connected with the optical input port of the optical reception section 20.

The optical processing section 34 performs predetermined optical processing on an optical signal given to the optical input port thereof, to output it from the optical output port thereof. The predetermined optical processing performed in this optical processing section 34 is processing of, for example, optical spectrum measurement, optical amplification, wavelength dispersion compensation and the like, which are usually hard to be made common to both the transmitting side and receiving side, as mentioned previously. In many cases, a device to realize such optical processing has a single directionality necessary to perform individualized processing so as to correspond to a propagation direction of an optical signal. For example, as a specific configuration of the optical processing section 34 that performs optical amplification, there is an optical fiber amplifier or the like in which an optical isolator is disposed on an optical path in order to suppress an influence by the reflection of pumping light. Further, as a specific configuration in the case where wavelength dispersion compensation is performed, there is a variable dispersion compensator utilizing a virtually imaged phased array (VIPA), which demultiplexes a WDM light into a plurality of optical beams that can be distinguished spatially according to wavelengths. The optical processing section 34 of the present invention comprises at least one of the devices described above. A specific structural example of the optical processing section 34 will be described in detail in another embodiment described later.

The supervisory control section 40 controls the optical processing section 34 of the bidirectional optical unit 30 based on operating states of the optical transmission section 10 and the optical reception section 20, and also controls the optical transmission section 10 or the optical reception section 20 according to the processing results of the optical processing section 34.

Next is a description of an operation of the optical apparatus 1 of the first embodiment.

In the optical apparatus 1 with the configuration described above, for example, a wavelength $\lambda A$ is allocated to a transmitted light to be sent from the own apparatus to the other apparatus, and a wavelength $\lambda B$ is allocated to a received light to be sent from the other apparatus to the own apparatus. In this case, an optical signal of the wavelength $\lambda A$ is generated in the optical transmission section 10, to be given to the second port of the optical multiplexing/demultiplexing section 32 in the bidirectional optical unit 30. An optical signal of the wavelength $\lambda B$, which is input to the first port of the optical multiplexing/demultiplexing section 31 after propagated through the transmission path fiber 2 and then, is output from the third port of the optical multiplexing/demultiplexing section 31, is given to the third port of the optical multiplexing/demultiplexing section 32. Accordingly, in the optical multiplexing/demultiplexing section 32, the optical signal of the wavelength $\lambda A$ and the optical signal of the wavelength $\lambda B$ are multiplexed, and the optical signals of the wavelengths $\lambda A$ and $\lambda B$, which have been guided into a single direction, are output from the first port, to be given to the optical input port of the optical processing section 34.

Then, the optical signals of the respective wavelengths $\lambda A$ and $\lambda B$, which have been subjected to required optical processing in the optical processing section 34, are given to the first port of the optical multiplexing/demultiplexing section 33 and separated according to the wavelengths $\lambda A$ and $\lambda B$. The optical signal of the wavelength $\lambda A$, separated by the optical multiplexing/demultiplexing section 33, is given to the second port of the optical multiplexing/demultiplexing section 31, and is output from the first port, to be sent out to the transmission path fiber 2. On the other hand, the optical signal of the wavelength $\lambda B$, separated by the optical multiplexing/demultiplexing section 33, is given to the optical input port of the optical reception section 20, to be subjected to typical regeneration processing.

Further, in the present optical apparatus 1, when processing of bidirectional optical signals is performed in the processing flow as described above, the supervisory control section 40 supervisory controls the optical transmission section 10, the optical reception section 20 and the optical processing section 34. According to this supervisory control, for example, the power of the transmitted light output from the optical transmission section 10 and the power of the received light input to the optical reception section 20, are supervised, and an operation of the optical processing section 34 is controlled according to the supervisory information. Moreover, a processing state of the optical processing section 34 is supervised, and operations of the optical transmission section 10 and the optical reception section 20 are controlled according to the supervisory information. The supervisory control of each section by this supervisory control section 40 will be described in detail using a specific example in a second embodiment as described later.

Figure 9:
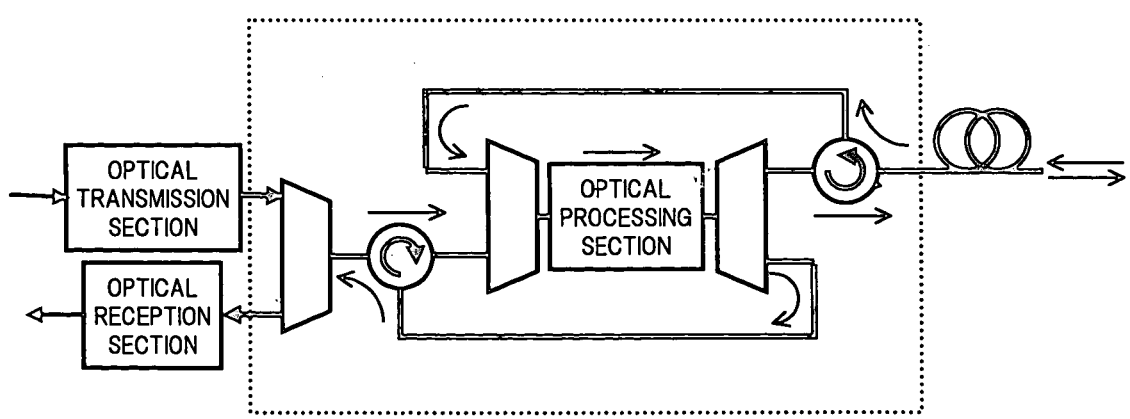
FIG. 9 is a diagram showing a configuration of a conventional optical apparatus in which the steams of bidirectional optical signals are made into the steam in a single direction.

According to the optical apparatus 1 of the first embodiment, by using a combination of the three optical multiplexing/demultiplexing sections 31 to 33, it is possible to process bidirectional optical signals simultaneously using only one optical processing section 34. In such a configuration of the bidirectional optical unit 30, two optical circulators are no longer necessary, in comparison with a conventional configuration shown in FIG. 9. Therefore, it is possible to reduce the number of components disposed around the optical processing section 34. As a result, it becomes possible to reduce an optical signal loss and reduce the apparatus cost.

Further, since the three optical multiplexing/demultiplexing sections 31 to 33 are constructed using the same type of devices, it is possible to integrate them. Especially, if the AWGs are used as the optical multiplexing/demultiplexing sections 31 to 33, it becomes possible to realize easily the integration of them on the same optical waveguide substrate. Moreover, by using the AWGs for the optical multiplexing/demultiplexing sections 31 and 32, it is possible to prevent a reflected light of the transmitted light in the bidirectional transmission path fiber 2 from being amplified by the optical processing section 34 as the received light. In addition, in the case where the lights are multiplexed using a WDM coupler or a normal optical coupler, a loss occurs during the multiplexing. However, by multiplexing the lights using the AWG, it is possible to suppress the occurrence of loss as described above, and this effect is significant especially in the case where the number of multiplexed wavelengths of WDM light is increased.

In the case where the AWGs are used as the optical multiplexing/demultiplexing sections 31 to 33, since the AWG generally has a filtering characteristic to cut out channels, then when a wavelength of signal light is varied or the temperature of the device is changed, there is a problem of attenuation of the signal light. However, in the present invention, assuming the case of application to a CWDM communication, for example, the spacing (inter-channel spacing) between signal lights of respective wavelengths is sufficiently wide relative to the wavelength width of each signal light. Therefore, even if the filter characteristic of the AWGs is varied, or the signal light wavelength is varied, there is no problem of attenuation of the signal light as described above.

Further, in the case where the device used for the optical processing section 34 in the optical apparatus 1 is capable of being integrated with the optical multiplexing/demultiplexing sections 31 to 33, it becomes also possible to produce the entire bidirectional optical unit 30 as one optical component, thus enabling the optical signal loss and the apparatus cost to be further reduced.

In addition, since each of the optical multiplexing/demultiplexing sections 31 to 33 also operates as an optical filter to the optical signals of the respective wavelengths $\lambda A$ and $\lambda B$, then, it becomes also possible to eliminate noise components, for example, ASE or the like, generated when the optical amplification is performed in the optical processing section 34, to thereby reduce the deterioration of the optical signal quality.

Next is a description of an optical apparatus for bidirectional optical communication according to a second embodiment of the present invention. Here, a consideration is made on the case where optical signals of eight wavelengths are transmitted bidirectionally, as a specific example of the first embodiment.

Figure 2:
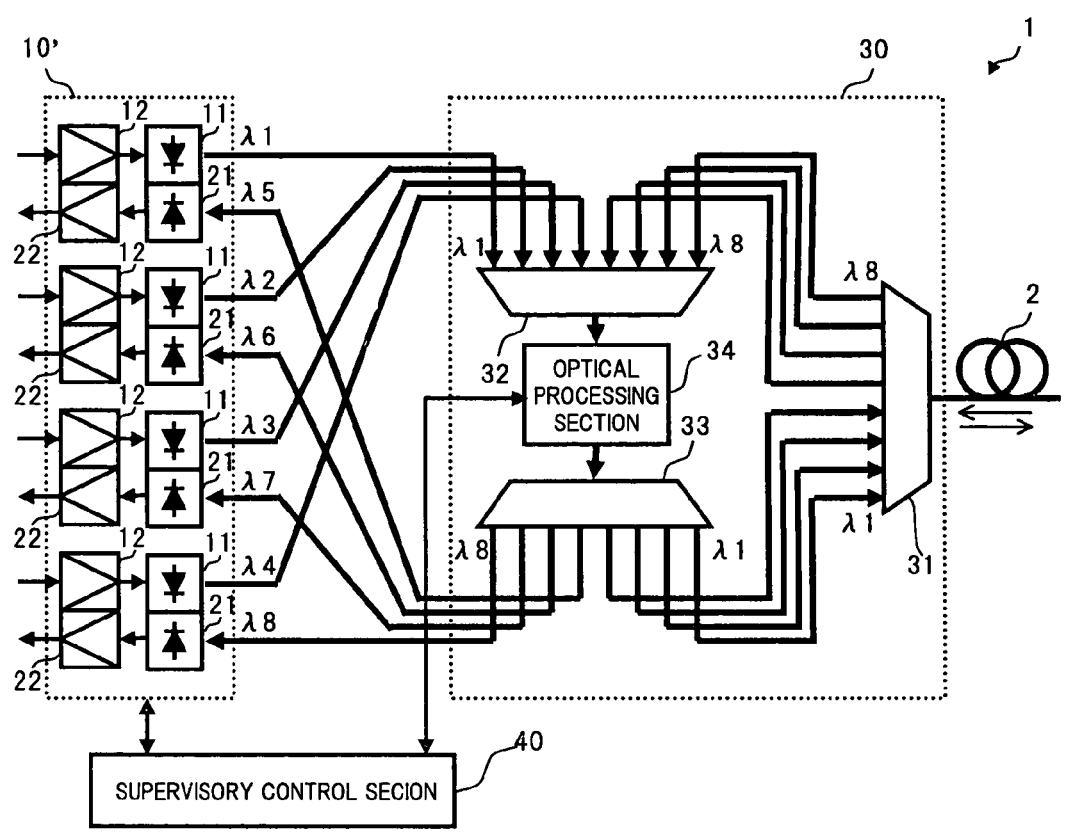
FIG. 2 is a functional block diagram showing a configuration of an optical apparatus for bidirectional optical communication according to a second embodiment of the present invention.

FIG. 2 is a functional block diagram showing a configuration of the optical apparatus of the second embodiment.

In the optical apparatus 1 shown in FIG. 2, $\lambda 1$ to $\lambda 4$ are allocated as wavelengths of transmitted lights to be sent from its own apparatus to the other apparatus, and $\lambda 5$ to $\lambda 8$ are allocated as wavelengths of received lights to be sent from the other apparatus to the own apparatus. An optical transmission/reception section 10' consists of, for example, a combination of four integrated transmission and reception type optical transceivers, and transmits and receives the optical signals of the wavelengths $\lambda 1$ to $\lambda 8$. Each optical transceiver of this optical transmission/reception section 10', here, generates a transmission light by means of a light source 11 and a drive circuit 12, and also regenerates a received light by means of a light receiving element 21 and a reception processing circuit 22.

Each of three optical multiplexing/demultiplexing sections 31 to 33 in the bidirectional optical unit 30 has eight demultiplexing side ports corresponding to the wavelengths $\lambda 1$ to $\lambda 8$, respectively, and one multiplexing side port. A relationship of connections between the ports of the optical multiplexing/demultiplexing sections 31 to 33 is the same as that in the first embodiment, by corresponding the wavelengths $\lambda 1$ to $\lambda 4$, to the wavelength $\lambda A$ in the first embodiment, and corresponding the wavelengths $\lambda 5$ to $\lambda 8$, to the wavelength $\lambda B$ in the first embodiment. Therefore, the description thereof is omitted here.

Figure 3:
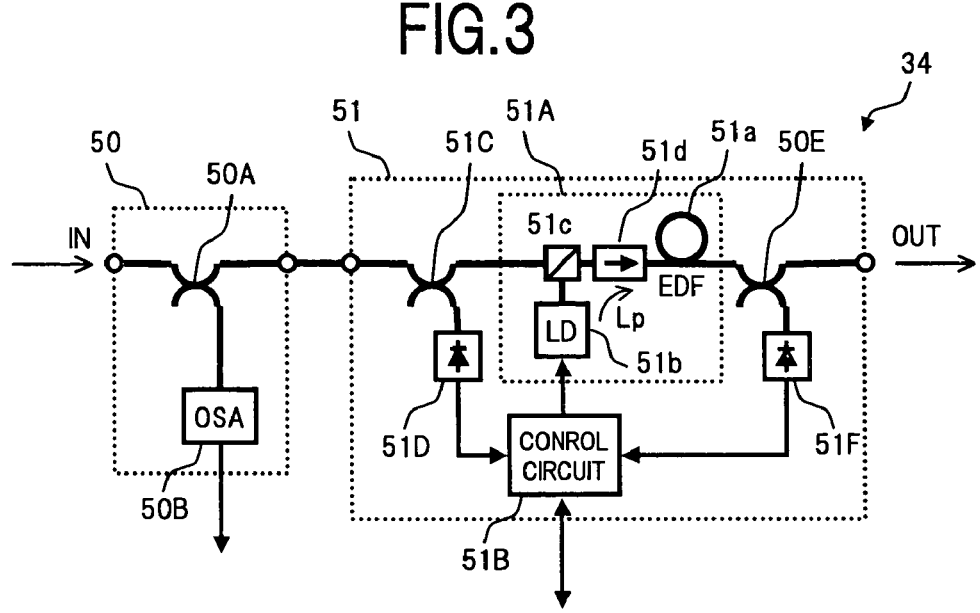
FIG. 3 is a block diagram showing a specific example of an optical processing section applied to the second embodiment.

Furthermore, a specific configuration as shown for example in FIG. 3 is adopted as the optical processing section 34 in the bidirectional optical unit 30. However, the configuration of the optical processing section is not limited to the example in FIG. 3.

In the configuration example of FIG. 3, the optical processing section 34 comprises a monitor circuit 50 for measuring the spectrum of an optical signal given to an optical input port IN thereof, and an optical amplification circuit 51 amplifying the optical signal passed through the monitor circuit 50, to a required level to output the amplified optical signal from an optical output port OUT thereof. The monitor circuit 50 branches a part of the optical signal from the optical input port IN by an optical coupler 50A, gives the branched optical signal to an optical spectrum analyzer (OSA) 50B, and outputs a signal indicating information relating to the optical spectrum measured by the optical spectrum analyzer 50B to the supervisory control section 40.

The optical amplification circuit 51 is provided with a known optical amplifier 51A to which the optical signal is input from the monitor circuit 50, and a control circuit 51B for controlling an operation of the optical amplifier 51A. The optical amplifier 51A includes, for example, an erbium doped fiber (EDF) 51a, a pumping light source 51b, a WDM coupler 51c and an optical isolator 51d. A pumping light Lp generated in the pumping light source 51b is supplied to the EDF 51a via the WDM coupler 51c and the optical isolator 51d. The control circuit 51B is given with: an input monitor signal, which is obtained by branching a part of the optical signal input to the optical amplifier 51A by an optical coupler 51C, and photoelectrically converting the branched optical signal by an optical receiver 51D; an output monitor signal, which is obtained by branching a part of the optical signal output from the optical amplifier 51A by an optical coupler 50E, and photoelectrically converting the branched optical signal by an optical receiver 51F; and a control signal sent from the supervisory control section 40. A signal for controlling a gain of the optical amplifier 51A based on each of the signals is output from the control circuit 51B to the optical amplifier 51A.

In the optical apparatus 1 of the second embodiment with the configuration described above, the optical signals of the wavelengths $\lambda 1$ to $\lambda 4$, output from the respective light sources of the optical transmission/reception section 10', are respectively given to the demultiplexing side ports corresponding to the wavelengths $\lambda 1$ to $\lambda 4$ of the optical multiplexing/demultiplexing section 32 in the bidirectional optical unit 30. The optical signals of the wavelengths $\lambda 5$ to $\lambda 8$, which are input to the optical multiplexing/demultiplexing section 31 after propagated through the transmission path fiber 2, and then demultiplexed, are respectively given to the demultiplexing side ports corresponding to the wavelengths $\lambda 5$ to $\lambda 8$ of this optical multiplexing/demultiplexing section 32. Accordingly, in the optical multiplexing/demultiplexing section 32, the WDM light in which the optical signals of wavelengths $\lambda 1$ to $\lambda 8$ are multiplexed to be made into a single direction, is output from the multiplexing side port, to be given to the optical input port IN of the optical processing section 34.

In the optical processing section 34, the spectrum of the WDM light from the optical multiplexing/demultiplexing section 32 is first measured in the monitor circuit 50, and a supervisory signal indicating the measurement result is transmitted to the supervisory control section 40. The WDM light passed through the monitor circuit 50 is next given to the optical amplification circuit 51, amplified to a required level by the optical amplifier 51A, whose drive state is controlled by the control circuit 51B, and output from the optical output port OUT to the multiplexing side port of the optical multiplexing/demultiplexing section 33. In the optical multiplexing/demultiplexing section 33, the WDM light from the optical processing section 34 is demultiplexed, and the optical signals of the wavelengths $\lambda 1$ to $\lambda 4$ are respectively given to the corresponding demultiplexing side ports of the optical multiplexing/demultiplexing section 31, and output from the multiplexing side port to the transmission path fiber 2. On the other hand, the optical signals of the wavelengths $\lambda 5$ to $\lambda 8$, demultiplexed in the optical multiplexing/demultiplexing section 33, are regenerated by the light receiving elements 21 and the reception processing circuits 22 corresponding to the respective wavelengths in the optical transmission/reception section 10'.

Here is a detailed description of the wavelength allocation of bidirectional optical signals in the second embodiment.

In general, in the bidirectional optical communication, since a transmitted light and a received light are propagated in directions opposite to each other through a transmission path, no interference occurs in a normal transmission state. However, it is not possible to make the intensity of light traveling in an opposing direction infinitesimal due to the reflection or the like in a connector, for example. Therefore, interference is a problem between optical signals with adjacent wavelengths, even if the transmitted light and the received light are propagated in directions opposite to each other. Furthermore, in the configuration of the present invention, since the transmitted light and the received light are propagated in the same direction in the optical processing section 34 by the bidirectional optical unit 30, interference between the transmitted light and the received light is a bigger problem. To be specific, regarding interference occurring between optical signals with adjacent wavelengths, in the case where there is a large level difference between adjacent optical signals such as the transmitted light and the received light, there is a problem of the deterioration of an S/N ratio due to the interference between the side lobes of the transmitted light and the received light. Especially, in the CWDM communication, since a wavelength control of optical signals is not performed as strictly as in a DWDM communication, there is a possibility that interference between the transmitted light and the received light, as described above, occurs due to a variation in the wavelengths of the optical signals.

Figure 4:
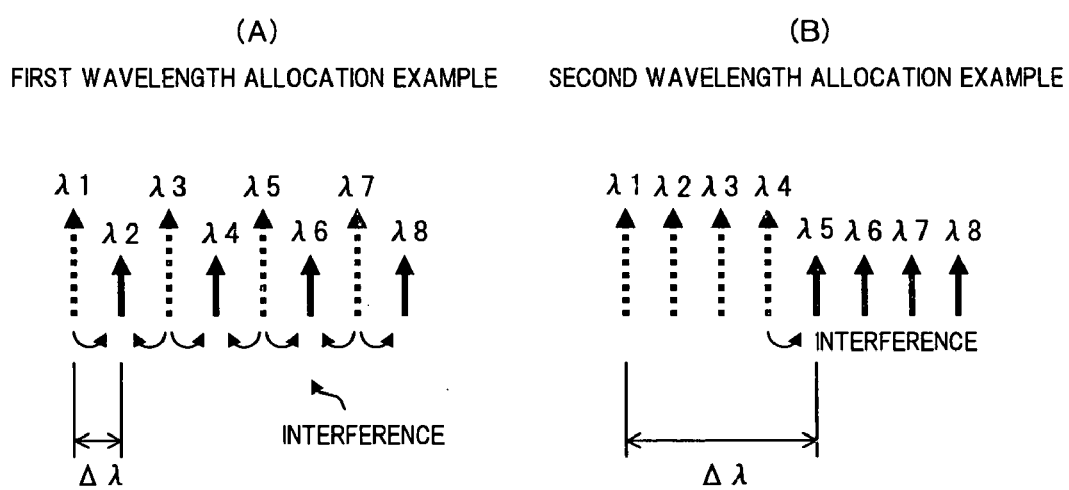
FIG. 4 is a diagram showing examples of wavelength allocation for bidirectional optical signals of eight wavelengths.

FIG. 4 is a diagram showing two types of wavelength allocation example for bidirectional optical signals of eight wavelengths.

A first wavelength allocation example shown in (A) of FIG. 4 shows the case where $\lambda 1$, $\lambda 3$, $\lambda 5$ and $\lambda 7$ are allocated as wavelengths of the transmitted light, $\lambda 2$, $\lambda 4$, $\lambda 6$ and $\lambda 8$ are allocated as wavelengths of the received light, and the wavelengths of the transmitted lights and the received lights are allocated alternately on wavelength grids. On the other hand, a second wavelength allocation example shown in (B) of FIG. 4 shows the case where, as described above, $\lambda 1$ to $\lambda 4$ are allocated as wavelengths of the transmitted light, $\lambda 5$ to $\lambda 8$ are allocated as wavelengths of the received light, and a wavelength band of the transmitted light and a wavelength band of the received light are set to be different from each other. Here, the wavelengths $\lambda 1$ to $\lambda 8$ are allocated at equal spacing. However, they may be allocated at arbitrary spacing.

In the case of the first wavelength allocation example, there is an advantage in that the bandwidth of the transmission path fiber 2 can be used efficiently, but there is a disadvantage in that there is a lot of interference of the transmitted light to the received light. In other words, the wavelength bandwidth $\Delta\lambda$ required for the bidirectional transmission may be the optimal width corresponding to the number of channels. For example, in the case of one channel (one opposite direction), the bandwidth may be of the minimum wavelength spacing. Therefore, the wavelength band to be used can be controlled flexibly according to an increase and decrease of the number of optical signals transmitted and received, and it is possible to use the bandwidth of the transmission path fiber 2 efficiently. However, each of the three wavelengths $\lambda 3$, $\lambda 5$ and $\lambda 7$ among the received light wavelengths has the transmitted light wavelengths placed on both sides of them. Therefore, there is a possibility that there occurs a lot of interference of the transmitted light to the received light.

On the other hand, in the case of the second wavelength allocation example, there is an advantage in that there is little interference of the transmitted light to the received light. However, there is a disadvantage in that it is difficult to use the bandwidth of the transmission path fiber 2 efficiently. In other words, since only one wavelength $\lambda 5$ among the received light wavelengths is adjacent to one wavelength $\lambda 4$ among the transmitted light wavelengths, there is little interference of the transmitted light to the received light. However, since the wavelength bandwidth $\Delta\lambda$ necessary for the bidirectional transmission requires at least four spaces (from $\lambda 1$ to $\lambda 5$), even in the case of one channel, the utilization efficiency of the transmission path fiber 2 is lowered.

The second wavelength allocation example is adopted in the configuration of the second embodiment shown in FIG. 2. However, which wavelength allocation example is selected, can be determined appropriately depending on the specification of a system or the like.

Next is a detailed description of an operation of the supervisory control section 40 of the second embodiment.

The supervisory control section 40 supervises the power of the transmitted light output from each of the light sources 11 corresponding to the wavelengths $\lambda 1$ to $\lambda 4$. Supervision of the transmitted light power is performed, for example, by detecting the power (back power) of a backwardly emitted light traveling in a direction opposite to that of the transmitted light by means of a monitoring optical receiver which is integrated with the normal light source 11, and sending a transmitted light monitor signal indicating the detection result to the supervisory control section 40. In the supervisory control section 40, the transmitted light power of each of the wavelengths is detected based on the transmitted light monitor signal, and a previously set target control value of the transmitted light power is compared with a monitor value. Then, an operation of the drive circuit 12 corresponding to each of the wavelengths is controlled based on the comparison result, such that the transmitted light power of each of the wavelengths $\lambda 1$ to $\lambda 4$ is fixed at the target value.

Further, in the supervisory control section 40, the transmitted light powers of the respective wavelengths are supervised collectively utilizing optical spectrum information monitored by the monitor circuit 50 in the optical processing section 34, and the target control value set in advance in the supervisory control section 40 is updated such that dispersion of the transmitted light powers of the respective wavelengths is corrected, or wavelength dependence of the loss in the transmission path fiber 2 is compensated for in advance.

In the supervisory control section 40, together with the supervisory control of the transmitted light power as described above, the reception state of the optical signals of the respective wavelengths $\lambda 5$ to $\lambda 8$ is supervised, and the light receiving element 21 or the reception processing circuit 22 corresponding to each wavelength is controlled. To be specific, the reception state is supervised, by sending a part of the signal photoelectrically converted by the light receiving element 21 corresponding to each wavelength, to the supervisory control section 40, as a received light monitor signal. The supervisory control section 40 detects information relating to signal amplitude and signal speed (bit rate) corresponding to each wavelength, based on the received light monitor signal. Then, according to the detected information, there is performed a control of bias to be applied to the light receiving element 21 corresponding to each wavelength (control of a multiplication factor in the case where the light receiving element 21 is an APD), or a control of the reception band of the reception processing circuit 22.

In addition, based on the supervisory information of the transmitted light power and the received light power, the supervisory control section 40 also controls a gain of the optical amplification circuit 51 of the optical processing section 34. This gain control is, for example, such that in the case where the received light power is low, and is outside a controllable range by the reception processing circuit 22, a control is performed for increasing the gain of the optical amplifier 51A within a range where the transmitted light power does not exceed a defined power.

According to the optical apparatus 1 of the second embodiment as described above, for the bidirectional optical signals of eight wavelengths, it is also possible to achieve the same effect as in the first embodiment.

In the second embodiment, the description has been made on the case where the bidirectional optical signals of eight wavelengths are processed. However, in the present invention, the number of wavelengths of the bidirectional optical signals is not limited to the above described example, and the present invention may be applied to arbitrary number of wavelengths of bidirectional optical signals. Further, the number of wavelengths of the transmitted light and the number of wavelengths of the received light are set to be the same. However, different numbers of wavelengths may be allocated to the transmitted light and the received light. Moreover, there has been shown the example in which the integrated transmission and reception type optical transceivers are used. However, the transmission and reception functions do not need to be paired.

Next is a description of an application example of a configuration of a node apparatus of a bidirectional optical communication network using the above-mentioned optical apparatus of the second embodiment.

Figure 5:
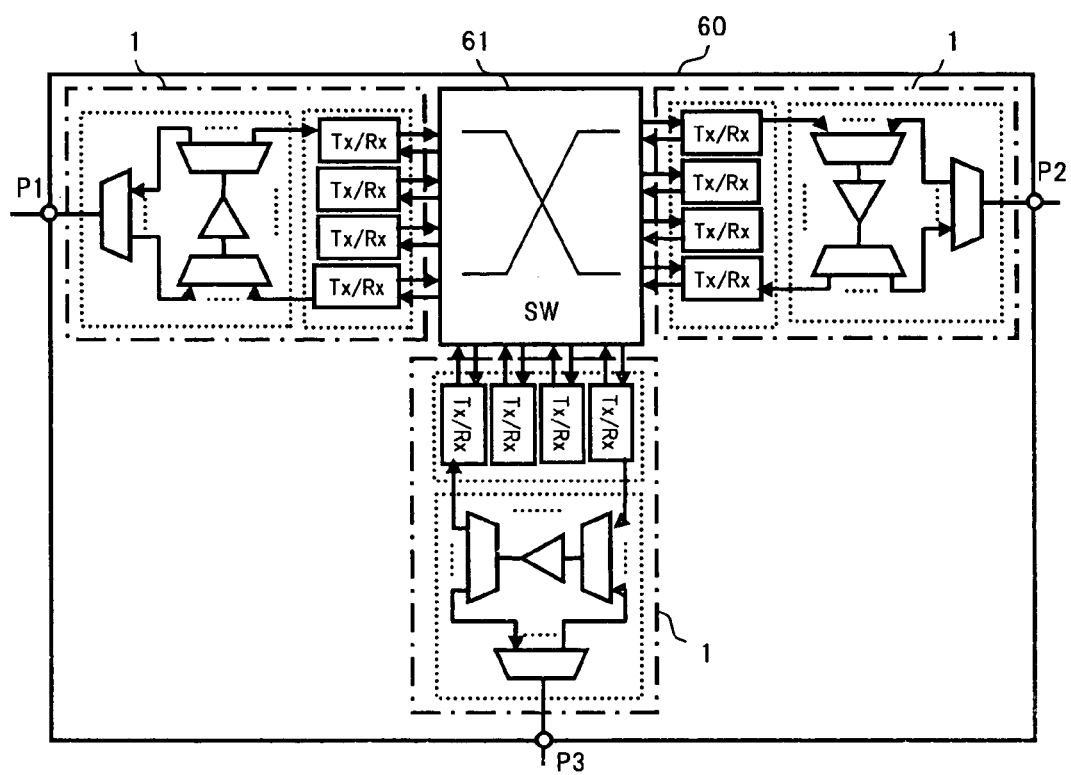
FIG. 5 is a diagram showing an application example in which a node apparatus is constructed using optical apparatuses of the second embodiment.

FIG. 5 is a diagram showing a configuration example of the node apparatus. This node apparatus 60 includes, for example, two optical input-output ports P1 and P2 for a trunk line system optical transmission path, and an optical input-output port P3 for a subscriber interface, which branches an optical signal being propagated through the trunk line system optical transmission path to a subscriber side, and is provided with the optical apparatus 1 as shown in FIG. 2 for each of the optical input-output ports P1 to P3. The optical apparatuses 1 are connected by a switch circuit 61 for switching the connection states between the data input ports and data output ports of the respective optical transmission/reception sections, and it is possible to convert an optical signal of an arbitrary wavelength, received by an arbitrary optical input-output port to an optical signal of another arbitrary wavelength, to transmit this from another arbitrary optical input-output port. Especially, by using a 12×12 non-blocking type switch, for example, as the switch circuit 61, an operation as a complete switching node is possible. However, this does not mean that the switch circuit 61 of the node apparatus 60 is limited to such a non-blocking type configuration. It is also possible to construct the node apparatus 60 by using a blocking type switch. The non-blocking type switch means a switch capable of switching connections between a plurality of ports as desired.

According to the node apparatus 60 as described above, it is possible to realize required optical processing to be performed for each of the optical input-output ports P1 to P3 to/from which the bidirectional optical signals are input/output, with a simple structure. Therefore, it is possible to provide, at low cost, a small sized node apparatus with low power consumption and low loss.

Here is a description, using a specific example, of a bidirectional optical communication network constructed using a plurality of the node apparatuses 60 as described above.

Figure 6:
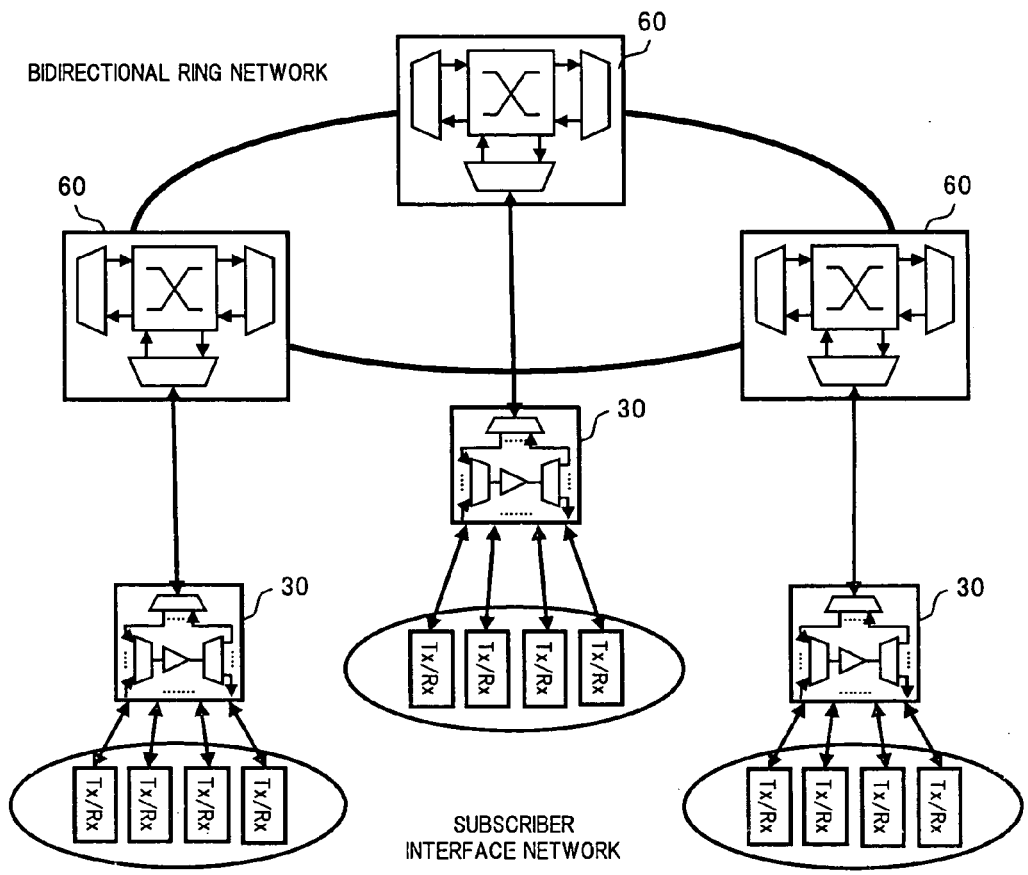
FIG. 6 is a diagram showing an example of a bidirectional optical communication network in which the node apparatus of FIG. 5 is utilized.

FIG. 6 is a diagram showing a configuration example of the above-described bidirectional optical communication network. In this configuration example, a bidirectional ring network is constructed by connecting the trunk line system optical transmission path optical input-output ports of each of the node apparatuses 60 in a ring shape, and a subscriber interface network is constructed by connecting between the subscriber interface optical input-output ports of each of the node apparatuses 60 and the optical transmitters and receivers (Tx/Rx) of each of a plurality of subscribers, via the bidirectional optical units 30 (refer to FIG. 2) installed for the subscribers. Using such a construction, bidirectional WDM transmission is performed by one optical fiber ring in the trunk line system, and also bidirectional WDM transmission is also performed between the node apparatuses 60 and the bidirectional optical units 30 by one optical fiber in a subscriber system.

According to such a bidirectional optical communication network, it is possible to reduce the cost of maintenance and administration of the entire network by using the node apparatuses 60 and the bidirectional optical units 30 with simple structures. Therefore, it is possible to provide an economical bidirectional optical communication network.

Figure 7:
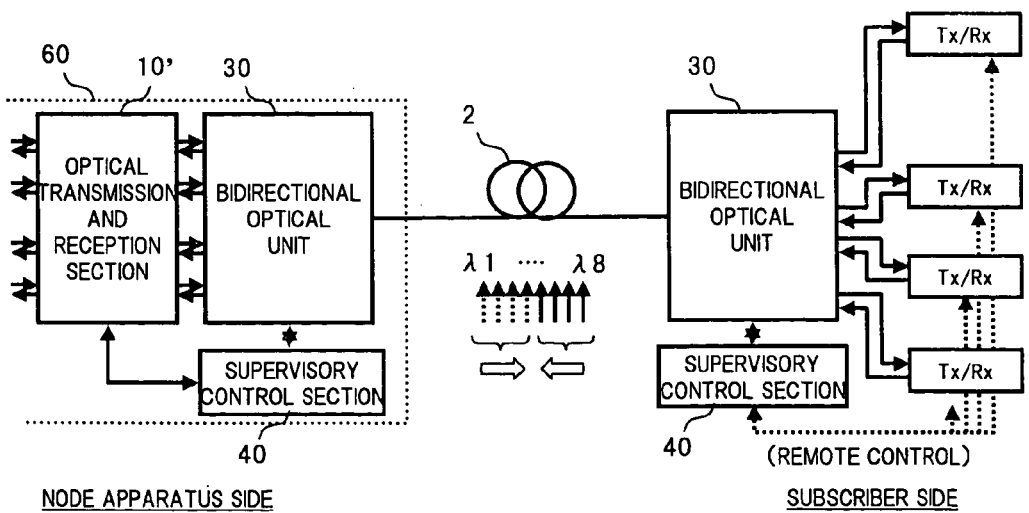
FIG. 7 is a diagram showing a specific example of a subscriber interface network in the bidirectional optical communication network of FIG. 6.
Figure 8:
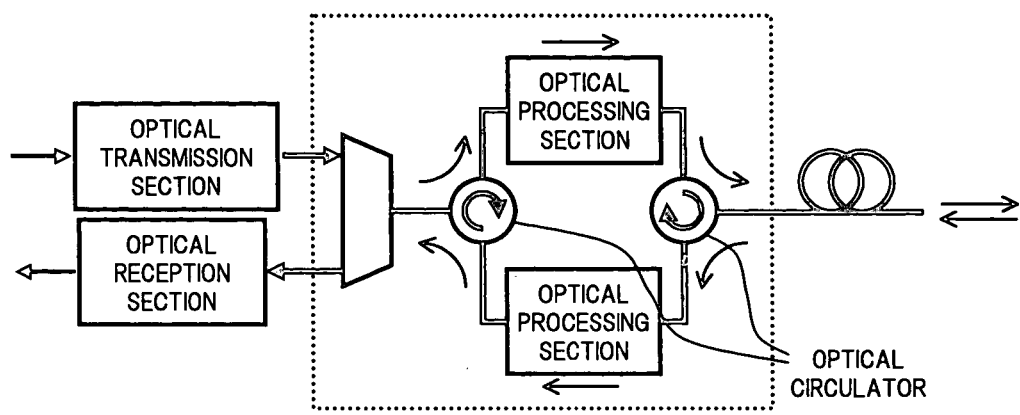
FIG. 8 is a diagram showing a configuration of a conventional optical apparatus for bidirectional optical communication.

Here is a detailed description of the subscriber interface network in the above-described bidirectional optical communication network, with reference to a specific example in FIG. 7.

In the specific example of FIG. 7, the wavelength allocation of the directional optical signals is performed in accordance with the second wavelength allocation example shown in (B) of FIG. 4. $\lambda 1$ to $\lambda 4$ are allocated as wavelengths of optical signals transmitted from a node apparatus 60 side to a subscriber side, while $\lambda 5$ to $\lambda 8$ are allocated as wavelengths of optical signals transmitted from the subscriber side to the node apparatus 60 side.

In the subscriber interface network, since each subscriber is normally located at an arbitrary base, distances from the bidirectional optical unit 30 to the respective subscribers are different. Accordingly, the setting of transmitted light power, receiver sensitivity and the like, required by the optical transmitters and receivers of the respective subscribers, is different for each subscriber. In such a situation, in the subscriber interface network shown in FIG. 7, for example, by providing the monitor circuit 50 as exemplarily shown in FIG. 3 as the optical processing section 34 in the bidirectional optical unit 30, it is possible to supervise the levels of the transmitted light and the received light for each subscriber, and control optimally the transmitted light power, receiver sensitivity and the like, of the optical transmitter and receiver of each subscriber by remote control operation according to the supervisory result.

What is claimed is:

1. An optical apparatus for bidirectional optical communication comprising:
   an optical transmission section configured to generate a signal light in accordance with a data signal inputted to a data input port, to thereby transmit the signal light as a transmitted light;
   an optical reception section configured to receive a light inputted thereto and having a wavelength different from that of the transmitted light from said optical transmission section, to thereby regenerate said light inputted thereto as a data signal to be outputted from a data output port;

an apparatus, including therein an optical isolator, and configured to output a light inputted thereto, by way of said optical isolator;

a first optical component, including a first port, a second port and a third port, and configured to allow a light inputted to said first port to output from said third port, and to allow a light inputted to said second port to output from said first port;

a second optical component configured to multiplex the transmitted light output from said optical transmission section with the light outputted by said third port of said first optical component, to thereby output the multiplexed light into said apparatus; and a third optical component configured to separate the light outputted by said optical isolator of said apparatus into separate lights in accordance with a wavelength difference, to thereby allow the separated lights to output toward the second port of said first optical component and toward to said optical reception section, respectively.

2. An optical apparatus according to claim 1, wherein said second optical component includes a plurality of demultiplexing side ports respectively corresponding to optical signals of a plurality of wavelengths contained in the transmitted light output from said optical transmission section, and a plurality of demultiplexing side ports respectively corresponding to optical signals of a plurality of wavelengths contained in the light output from the third port of said first optical component.

3. An optical apparatus according to claim 1, further comprising;

a supervisory control section that controls at least one of said optical transmission section, said optical reception section and said apparatus, based on at least one of operational states of said optical transmission section, said optical reception section and said apparatus.

4. An optical apparatus according to claim 1, wherein said transmitted light and said received light each contains a plurality of optical signals of different wavelengths, and said first optical component, said second optical component, and said third optical component each has a plurality of demultiplexing side ports respectively corresponding to wavelengths of a plurality of optical signals contained in said transmitted light, a plurality of demultiplexing side ports respectively corresponding to wavelengths of a plurality of optical signals contained in said received light, and one multiplexing side port.

5. A node apparatus including a plurality of optical input-output ports connected with an optical transmission path which propagates a plurality of optical signals of different wavelengths bidirectionally, for performing the switching of optical signals respectively input to and output from said plurality of optical input-output ports, wherein a plurality of optical apparatuses in claim 1 is provided respectively corresponding to said plurality of optical input-output ports, and the first ports of the first optical components of said plurality of optical apparatuses are connected with corresponding optical input-output ports, and there is provided a switch circuit capable of arbitrarily switching connections between transmission data input ports of the optical transmission sections and receiving data output ports of the optical reception sections of said plurality of optical apparatuses.

6. An optical apparatus for bidirectional optical communication comprising:

an optical transmission section that outputs a transmitted light;

an optical reception that inputs a received light with a wavelength different from that of the transmitted light;

an apparatus, including therein an optical isolator, and configured to output a light inputted thereto, by way of said optical isolator;

a first optical component, including a first port, a second port and a third port, and configured to allow a light inputted to said first port to output from said third port, and to allow a light inputted to said second port to output from said first port;

a second optical component configured to multiplex the transmitted light output from said optical transmission section with the light outputted by said third port of said first optical component, to thereby output the multiplexed light into said apparatus; and a third optical component configured to separate the light outputted by said optical isolator of said apparatus into separate lights in accordance with a wavelength difference, to thereby allow the separated lights to output toward the second port of said first optical component and toward to said optical reception section, respectively, and wherein said second optical component includes a plurality of demultiplexing side ports respectively corresponding to optical signals of a plurality of wavelengths contained in the transmitted light output from said optical transmission section, and a plurality of demultiplexing side ports respectively corresponding to optical signals of a plurality of wavelengths contained in the light output from the third port of said first optical component.

7. An optical apparatus for bidirectional optical communication comprising:

an optical transmission section that outputs a transmitted light;

an optical reception that inputs a received light with a wavelength different from that of the transmitted light;

an apparatus, including therein an optical isolator, and configured to output a light inputted thereto, by way of said optical isolator;

a first optical component, including a first port, a second port and a third port, and configured to allow a light inputted to said first port to output from said third port, and to allow a light inputted to said second port to output from said first port;

a second optical component configured to multiplex the transmitted light output from said optical transmission section with the light outputted by said third port of said first optical component, to thereby output the multiplexed light into said apparatus; and a third optical component configured to separate the light outputted by said optical isolator of said apparatus into separate lights in accordance with a wavelength difference, to thereby allow the separated lights to output toward the second port of said first optical component and toward to said optical reception section, respectively, and wherein
said transmitted light and said received light each contains a plurality of optical signals of different wavelengths, and
said first optical component, said second optical component, and said third optical component each has a plurality of demultiplexing side ports respectively corresponding to wavelengths of a plurality of optical signals contained in said transmitted light, a plurality of demultiplexing side ports respectively corresponding to wavelengths of a plurality of optical signals contained in said received light, and one multiplexing side port.

8. A node apparatus including a plurality of optical input-output ports connected with an optical transmission path which propagates a plurality of optical signals of different wavelengths bidirectionally, for performing the switching of optical signals respectively input to and output from said plurality of optical input-output ports, wherein
a plurality of optical apparatuses for bidirectional optical communication are provided, each optical apparatus comprising
an optical transmission section configured to generate a signal light in accordance with a data signal inputted to a data input port, to thereby transmit the signal light as a transmitted light,
an optical reception section configured to receive a light inputted thereto and having a wavelength different from that of the transmitted light from said optical transmission section, to thereby regenerate said light inputted thereto as a data signal to be outputted from a data output port,
an apparatus, including therein an optical isolator, and configured to output a light inputted thereto, by way of said optical isolator,
a first optical component, including a first port, a second port and a third port, and configured to allow a light inputted to said first port to output from said third port, and to allow a light inputted to said second port to output from said first port,
a second optical component configured to multiplex the transmitted light output from said optical transmission section with the light outputted by said third port of said first optical component, to thereby output the multiplexed light into said apparatus, and
a third optical component configured to separate the light outputted by said optical isolator of said apparatus into separate lights in accordance with a wavelength difference, to thereby allow the separated lights to output toward the second port of said first optical component and toward to said optical reception section, respectively;
the plurality of optical apparatuses respectively correspond to said plurality of optical input-output ports, and the first ports of the first optical components of said plurality of optical apparatuses are connected with corresponding optical input-output ports, and
a switch circuit capable of arbitrarily switching connections between transmission data input ports of the optical transmission sections and receiving data output ports of the optical reception sections of said plurality of optical apparatuses.

* * * * *